United States Patent
Ghosh

(10) Patent No.: US 10,476,866 B2
(45) Date of Patent: Nov. 12, 2019

(54) SYSTEM AND METHOD FOR STORING AND DELIVERING DIGITAL CONTENT

(71) Applicant: Wipro Limited, Bangalore (IN)

(72) Inventor: Soumik Ghosh, Kolkata (IN)

(73) Assignee: Wipro Limited, Bangalore (IN)

( * ) Notice: Subject to any disclaimer, the term of this patent is extended or adjusted under 35 U.S.C. 154(b) by 319 days.

(21) Appl. No.: 15/440,409

(22) Filed: Feb. 23, 2017

(65) Prior Publication Data

US 2018/0198771 A1 Jul. 12, 2018

(30) Foreign Application Priority Data

Jan. 12, 2017 (IN) .............................. 201741001354

(51) Int. Cl.
*H04L 29/06* (2006.01)
*H04L 29/08* (2006.01)
*H04L 1/00* (2006.01)

(52) U.S. Cl.
CPC ............ *H04L 63/083* (2013.01); *H04L 67/06* (2013.01); *H04L 67/1097* (2013.01); *H04L 1/0061* (2013.01)

(58) Field of Classification Search
CPC ... H04L 63/083; H04L 67/06; H04L 67/1097; H04L 1/0061
See application file for complete search history.

(56) References Cited

U.S. PATENT DOCUMENTS

| | | |
|---|---|---|
| 8,108,502 B2 | 1/2012 | Tabbara et al. |
| 9,442,571 B2 | 9/2016 | Zhang et al. |
| 9,442,671 B1 * | 9/2016 | Zhang .................... G06F 3/0635 |
| 9,697,217 B1 * | 7/2017 | Salyers .................. H04L 9/0643 |
| 9,959,280 B1 * | 5/2018 | Whitehead ............ G06F 16/162 |
| 10,110,676 B2 * | 10/2018 | Bestler ................ H04L 67/1097 |

(Continued)

FOREIGN PATENT DOCUMENTS

| | | |
|---|---|---|
| EP | 2 552 075 | 1/2013 |
| WO | WO 2010/011968 | 1/2010 |
| WO | WO 2013/030207 | 3/2013 |

OTHER PUBLICATIONS

Extended European Search Report issued in European Patent Office in counterpart European Application No. 17163385.2, dated Sep. 28, 2017, 7 pages.

*Primary Examiner* — Joseph P Hirl
*Assistant Examiner* — Stephen T Gundry
(74) *Attorney, Agent, or Firm* — Finnegan, Henderson, Farabow, Garrett & Dunner, LLP

(57) ABSTRACT

This disclosure relates to system and method for storing and delivering digital content. In one embodiment, a method is provided for storing a digital content of a content provider for subsequent delivery to an end user. The method comprises determining a need for storing the digital content on an ElasticSwarm, and dynamically creating the Elastic-Swarm based on the need. The ElasticSwarm comprises at least one of a plurality of registered stationary networked storage (SNS) devices available for creation of the Elastic-Swarm for the content provider. The method further comprises segmenting the digital content into a plurality of parts, and uploading each of the plurality of parts of the digital content along with a corresponding identification on the at least one of the plurality of registered SNS devices.

17 Claims, 9 Drawing Sheets

(56) References Cited

U.S. PATENT DOCUMENTS

| | | | | |
|---|---|---|---|---|
| 10,333,978 B2* | 6/2019 | van den Berghe | H04L 63/18 |
| 2013/0185563 A1* | 7/2013 | Djabarov | G06F 8/654 |
| | | | 713/176 |
| 2013/0254897 A1* | 9/2013 | Reedy | G06F 21/10 |
| | | | 726/26 |
| 2013/0305039 A1* | 11/2013 | Gauda | G06F 21/6218 |
| | | | 713/153 |
| 2014/0046906 A1* | 2/2014 | Patiejunas | G06F 21/606 |
| | | | 707/661 |
| 2014/0108474 A1* | 4/2014 | David | G06F 3/0611 |
| | | | 707/827 |
| 2016/0301751 A1* | 10/2016 | Peelen | H04L 67/104 |
| 2017/0041296 A1* | 2/2017 | Ford | G06F 16/951 |
| 2017/0118205 A1* | 4/2017 | Yang | H04L 9/3231 |
| 2017/0163683 A1* | 6/2017 | van den Berghe | |
| | | | H04L 63/0428 |
| 2017/0257446 A1* | 9/2017 | Bevilacqua | H04L 67/26 |
| 2017/0272316 A1* | 9/2017 | Johnson | H04L 61/301 |
| 2017/0293766 A1* | 10/2017 | Schnjakin | H04L 67/1097 |
| 2017/0308437 A1* | 10/2017 | Usvyatsky | H04L 69/40 |
| 2017/0359353 A1* | 12/2017 | Tan | G06F 3/0605 |
| 2018/0077219 A1* | 3/2018 | Tan | H04L 67/1097 |
| 2018/0167486 A1* | 6/2018 | Pacella | H04L 67/1097 |
| 2018/0359256 A1* | 12/2018 | Luzader | H04L 63/0876 |
| 2019/0012473 A1* | 1/2019 | Christmas | G06F 16/10 |
| 2019/0065705 A1* | 2/2019 | Bradley | G06F 21/10 |

* cited by examiner

SYSTEM AND METHOD FOR STORING AND DELIVERING DIGITAL CONTENT

TECHNICAL FIELD

This disclosure relates generally to digital content management, and more particularly to system and method for storing and delivering digital content.

BACKGROUND

In an increasingly digital world, digital content such as images, videos, audios, documents, etc. has become part and parcel of our life. Day after day, the volume of these digital content is growing exponentially. A number of content providers that may provide for proprietary or hosted digital content are delivering enormous amount of these digital contents to our computing devices (e.g., desktop, laptop, tablet, phone, etc.) through for online streaming, social media, search engines, and so forth. The modern communication system has only provided spurt in achieving this digital ecosystem.

However, network bandwidth is not scalable at the rate at which data volume grows. It takes years to increase network bandwidth. In other words, data and digital communication, the two fundamental elements for content providers, are highly interdependent, but they can't grow at same rate. This leads to the problem of delivering content to the user at a much slower speed, which in turn leads to poor user experience and impacts the business of the content providers.

Current solution to this problem is to bring the content at closer proximity of the user by installing some computing nodes of the content provider at various geographic regions. These computing nodes store the digital content locally and deliver the same to the end users in corresponding regions as and when required. The end users can therefore access the locally stored digital content at a faster bandwidth as it is in closer proximity. The content providers upload various digital contents at these computing nodes as per various criteria like access rate of the digital contents in that region, content size, privacy settings of the digital content, and so forth. However, the solution has few limitations. For example, it is challenging, cumbersome, and costly for the content providers to maintain these computing nodes. Additionally, these computing nodes still occupy the content provider's bandwidth to a lesser degree. Though some content providers are employing this model to achieve performance, many of them are not due to above mentioned limitations.

SUMMARY

In one embodiment, a method for storing a digital content of a content provider for subsequent delivery to an end user is disclosed. In one example, the method comprises determining a need for storing the digital content on an ElasticSwarm. The method further comprises dynamically creating the ElasticSwarm based on the need. The ElasticSwarm comprises at least one of a plurality of registered stationary networked storage (SNS) devices available for creation of the ElasticSwarm for the content provider. The method further comprises segmenting the digital content into a plurality of parts. The method further comprises uploading each of the plurality of parts of the digital content along with a corresponding identification on the at least one of the plurality of registered SNS devices.

In one embodiment, a system for storing a digital content of a content provider for subsequent delivery to an end user is disclosed. In one example, the system comprises at least one processor and a memory communicatively coupled to the at least one processor. The memory stores processor-executable instructions, which, on execution, cause the processor to determine a need for storing the digital content on an ElasticSwarm. The processor-executable instructions, on execution, further cause the processor to dynamically create the ElasticSwarm based on the need. The ElasticSwarm comprises at least one of a plurality of registered stationary networked storage (SNS) devices available for creation of the ElasticSwarm for the content provider. The processor-executable instructions, on execution, further cause the processor to segment the digital content into a plurality of parts. The processor-executable instructions, on execution, further cause the processor to upload each of the plurality of parts of the digital content along with a corresponding identification on the at least one of the plurality of registered SNS devices.

In one embodiment, a non-transitory computer-readable medium storing computer-executable instructions for storing a digital content of a content provider for subsequent delivery to an end user is disclosed. In one example, the stored instructions, when executed by a processor, cause the processor to perform operations comprising determining a need for storing the digital content on an ElasticSwarm. The operations further comprise dynamically creating the ElasticSwarm based on the need. The ElasticSwarm comprises at least one of a plurality of registered stationary networked storage (SNS) devices available for creation of the ElasticSwarm for the content provider. The operations further comprise segmenting the digital content into a plurality of parts. The operations further comprise uploading each of the plurality of parts of the digital content along with a corresponding identification on the at least one of the plurality of registered SNS devices.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
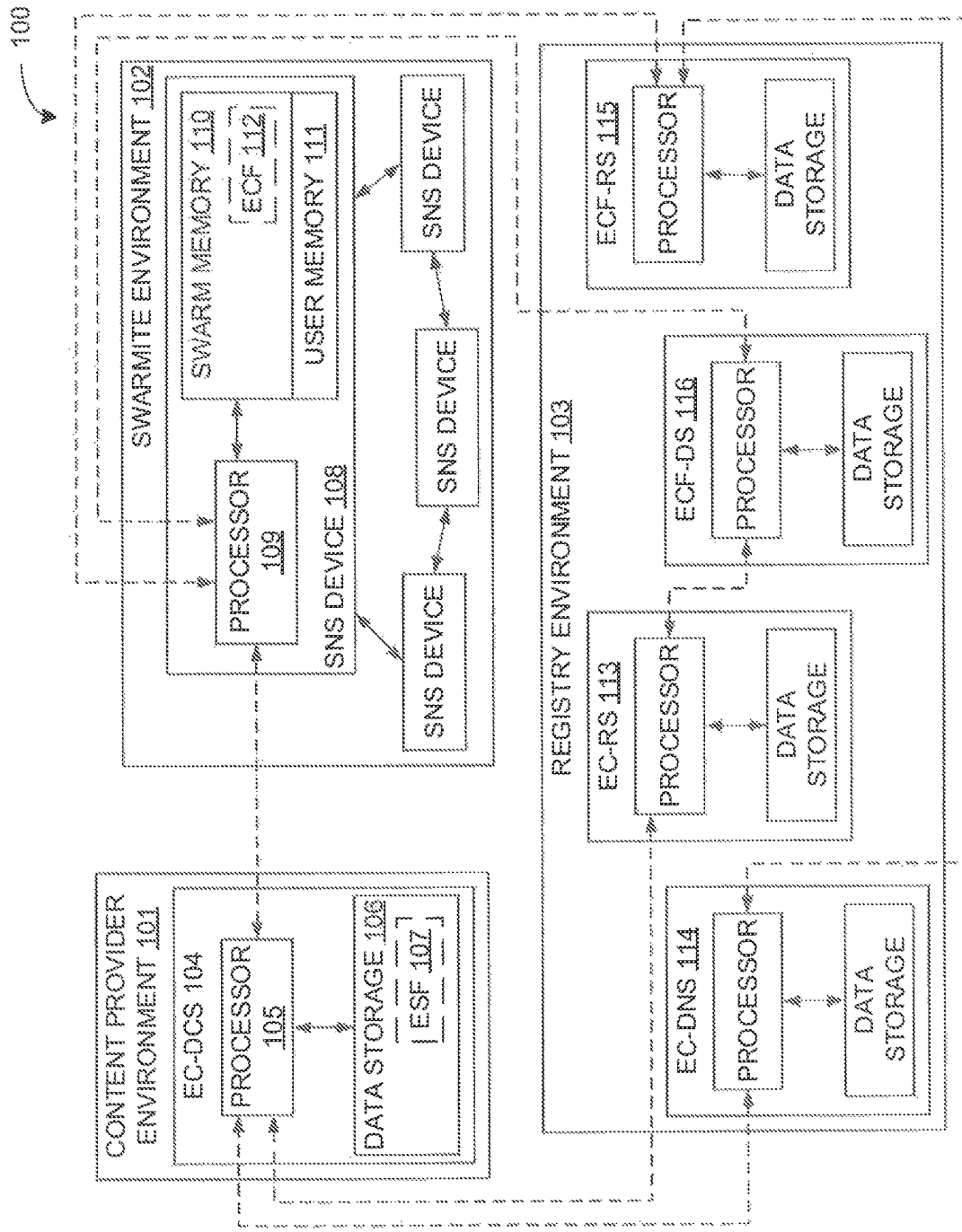
FIG. 1 is a block diagram of an exemplary distributed content storage and delivery (DCSD) system for storing and delivering digital content of a content provider in accordance with some embodiments of the present disclosure.

Referring now to FIG. 1, an exemplary distributed content storage and delivery (DCSD) system 100 for storing and delivering digital content is illustrated in accordance with some embodiments of the present disclosure. The DCSD system 100 comprises a content provider environment 101, a swarmite environment 102, and a registry environment 103. As will be appreciated, a content provider may be a digital content host (e.g., YouTube, Facebook, Netflix, etc.) whose data (i.e., digital content such as image, audio, video, or other files) needs to be distributed through the ElasticSwarm, and may also be referred to as ElasticSwarm customer (EC).

The content provider environment 101 comprises a number of data center servers 104 belonging to one or more content provider that is responsible for storing and delivering data and may also be referred to as ElasticSwarm customer data center server (EC-DCS). The EC-DCS 104 may also be responsible for uploading data into the ElasticSwarm and then manage and monitor the various nodes of the ElasticSwarm. Additionally, the EC-DCS 104 takes care of the transaction, security, billing, and other such essential attributes for ElasticSwarm. Each of the EC-DCS's comprises a processor 105 and a data storage 106. The data storage 106 may be communicatively coupled to the processor 105 and may store processor-executable instructions (e.g., operating system, software) as well as the data (i.e., digital content) that needs to be uploaded in ElasticSwarm. For example, the data storage 106 may store an ElasticSwarm server framework or software (ESF) 107. The ESF 107 is an ElasticSwarm server side software that needs to be installed on each of the EC-DCS's. As will be appreciated, in some embodiments, the ESF is a service that may be continuously running in the EC-DCS as it is a server-side component.

The processor 105 retrieves the ESF 107 from the data storage 106 and executed the same for on-boarding of the EC-DCS, for dynamic formation of ElasticSwarm, and for the management of digital content in the ElasticSwarm. As will be appreciated, the management may include, but is not limited to, storage or upload of digital content in the ElasticSwarm, delivery or download of digital content from the ElasticSwarm, deletion of digital content, update of digital content, migration of digital content, and so forth. Additionally, the processor 105 may communicate with a component in the registry environment 103 called registry service for the content providers or ElasticSwarm customers (EC-RS). The processor 105 may perform handshaking operation and may register itself with the EC-RS. It should be noted that the EC-DCS may be configured with the cluster address for the EC-RS. Further, the processor 105 may communicate with a component in the registry environment 103 called domain service for the content providers or ElasticSwarm customers (EC-DNS) to fetch a list of devices that would form the ElasticSwarm. Moreover, the processor 105 may instantiates an instance of ESF uploading service class (ESF-USC) within the ESF service each time it has to upload a unit of data (file or digital content) into the ElasticSwarm. Similarly, the processor 105 may instantiates an instance of ESF downloading service class (ESF-DSC) or ESF deleting service class (ESF-DelSC) within the ESF service each time it has to download or delete data from the ElasticSwarm.

The swarmite environment 102 comprises a number of computing nodes referred to as stationary networked storage (SNS) devices 108. A SNS device 108 may include, but is not limited to, a desktop computer, a laptop, a notebook, a server, a smartphone, a personal digital assistant, a tablet computer, and any other computing device capable of sharing at least a portion of their storage devices and capable of connecting with Internet over a wired or a wireless communication network. In some embodiments, the SNS device 108 may share at least a portion of their un-removable storage devices (e.g., hard disk drives, solid state drives, XD card, etc.) and may use a relatively economical Internet connection (e.g., broadband). The SNS devices 108 may be connected to each other in accordance with embodiments of the present disclosure so as to act as a peer-to-peer (P2P) device, and to form a P2P storage swarm also referred to as ElasticSwarm by combining their shared memory over the communication network. It should be noted that the SNS devices 108 are employed for purpose of storage and substantial computation is avoided over them. Further, it should be noted that the SNS devices 108 simultaneously push and pull data, which enables them to be capable of tethering internet across a group of devices. Individual users sharing at least a portion of storage of their SNS devices 108 to the ElasticSwarm are ElasticSwarm users and may also be referred to as swarmites.

Each of the SNS devices 108 may be configured with a custom or modified ElasticSearch application such that it may be used as a storage node within the shared storage devices. As will be appreciated, Elasticsearch is a popular distributed and scalable storage engine, thereby making it suitable for use as a storage agent within the individual storage nodes (i.e., the SNS devices 108) to form a P2P storage swarm. It has features such as real-time structured or unstructured search, and enables to address features such as replication, fail over, etc.

Each of the SNS devices 108 comprises a processor 109, and a data storage comprising of shared swarm memory 110 and unshared user memory 111. The data storage may be communicatively coupled to the processor 109 and may store processor-executable instructions (e.g., operating system, software) as well as the data (i.e., at least a portion of digital content) that is uploaded in ElasticSwarm. For example, the data storage may store an ElasticSwarm client framework or software (ECF) 112. The ECF 112 is an ElasticSwarm client side software that is installed on each of the SNS devices upon installation of the custom ElasticSearch application by the swarmite. As will be appreciated, the swarm memory 110 is the portion of the data storage that the swarmite commits for usage by the ElasticSwarm. During the configuration process, the swarmite may be prompted to indicate if the swarm memory 110 is to be used as a read intensive unit (RIU) or a write intensive unit (WIU). Additionally, the user memory 111 is the portion of the memory that the swarmite may prefer to keep un-shared for personal usage, for usage by the SNS device 108.

The processor 109 retrieves the ECF 112 from the data storage and executes the same for facilitating onboarding of SNS devices 108, for dynamic formation of ElasticSwarm, and for the management of digital content in the ElasticSwarm. For example, upon installation of the ECF 112, a configuration may be performed to segregate the user memory 111 and the swarm memory 110, as well as to set-up few other parameters (e.g., set-up swarm memory as RIU or WIU, etc.). Additionally, the processor 109 may communicate with a component in the registry environment 103 called registry service for the SNS devices (ECF-RS). The processor 109 may perform handshaking operation and may register itself with the ECF-RS. Further, the processor 109 may communicate with a component in the registry environment 103 called domain service for the SNS devices (ECF-DS) to fetch a list of EC's interested in delivering their content through ElasticSwarm so as to enable the swarmite to select the EC's that the swarmite may like to share the memory of his SNS device 108 with.

Thus, whenever the custom ElasticSearch application is installed into the SNS device 108, the event triggers the ECF 112 to popup and request the swarmite (i.e., user of the SNS device) to make a one-time configuration. During the configuration, the swarmite may indicate how he wants his device memory to be used by the ElasticSwarm. For example, few high level settings that may be set or unset during the one-time configuration may include, but are not limited to, the amount of storage that may be dedicated for the ElasticSwarm, the selection of the ElasticSwarm customer whose data may be stored in the swarm memory, and preference between use of swarm memory as RIU or WIU. It should be noted that, in some embodiments, the ECF may automatically pick up some of the device configurations (e.g., total or free space in the memory, type of memory, type of IP address, etc.) during configuration. Further, during the configuration process, few operations may be performed by the device without any user intervention. Once the swarmite's storage is configured, it becomes part of the ElasticSwarm and automatically uploads or downloads data into or from the ElasticSwarm (provided it's connected with the internet at that time). In some embodiments, such upload or download may be without the knowledge or control of the swarmite. On the other hand, potential EC's installs the ESF in their servers which facilitate the upload and download of information from and into the ElasticSwarm. It should be noted that, in some embodiments, the ECF 112 may enable the swarmite to change the initial configuration settings at a later stage to suit the swarmite's changing requirement.

The registry environment 103 comprises the EC-RS 113, the EC-DNS 114, the ECF-RS 115, and the ECF-DS 116. The EC-RS 113 is a universally available EC registry service. The EC-RS 113 is distributed in nature and acts as a registry for all EC's. The EC-RS 113 has a preconfigured list of the registered EC's. During handshaking operation, the EC-RS checks the EC against this list. If the EC is valid, the onboarding of the EC-DCS 104 for that EC is completed.

When the EC-DCS 104 configures an ElasticSwarm, it sends fetch request to the EC-DNS 114. The EC-DNS 114 interacts with the ECF-RS 115, fetches a list of available swarmites (i.e. SNS devices) that may be interested in forming the ElasticSwarm for the corresponding EC, and returns the same to the EC-DCS 104. It should be noted that, in some embodiments, the EC-RS 113 and EC-DNS 114 may reside on EC-DCS 104. Alternatively, the EC-RS 113 and EC-DNS 114 may reside in a separate third-party registry server.

The ECF-RS 115 is a registry service for SNS devices and is similar to the EC-RS 113. During handshaking operation, the SNS device 108 registers itself with the ECF-RS 115. During registration of the SNS devices 108, a selection of EC's has to be made by swarmites. The ECF-DS 116 fetches a list of EC's interested in delivering their content through ElasticSwarm from the EC-RS 113, and returns it back to ECF 112. The ECF 112 in turn prompts the swarmite to select the EC's that the swarmite may like to share the memory of his SNS device 108 with, and sends it to the ECF-DS 116 again. ECF-DS 116 updates the list to ECF-RS 115. It should be noted that, in some embodiments, the ECF-RS 115 or the ECF-DS 116 may be stored on one of the SNS device 108 and may move dynamically to other SNS devices 108 based on higher bandwidth connection, higher storage availability, availability of the SNS device, and so forth. Alternatively, the ECF-RS 115 or the ECF-DS 116 may reside in a separate third-party registry server. Further, as will be appreciated, each of the EC-RS 113, the EC-DNS 114, the ECF-RS 115, and the ECF-DS 116 may have a separate dedicated processor and data storage in the third-party registry server. Alternatively, each of the EC-RS 113, the EC-DNS 114, the ECF-RS 115, and the ECF-DS 116 may share a common processor and data storage in the third-party registry server.

Further, it should be noted that the above discussed subsystems, environments, components, engines, modules, etc. may be implemented in programmable hardware devices such as programmable gate arrays, programmable array logic, programmable logic devices, and so forth. Alternatively, the subsystems, environments, components, engines, modules, etc may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

Figure 2:
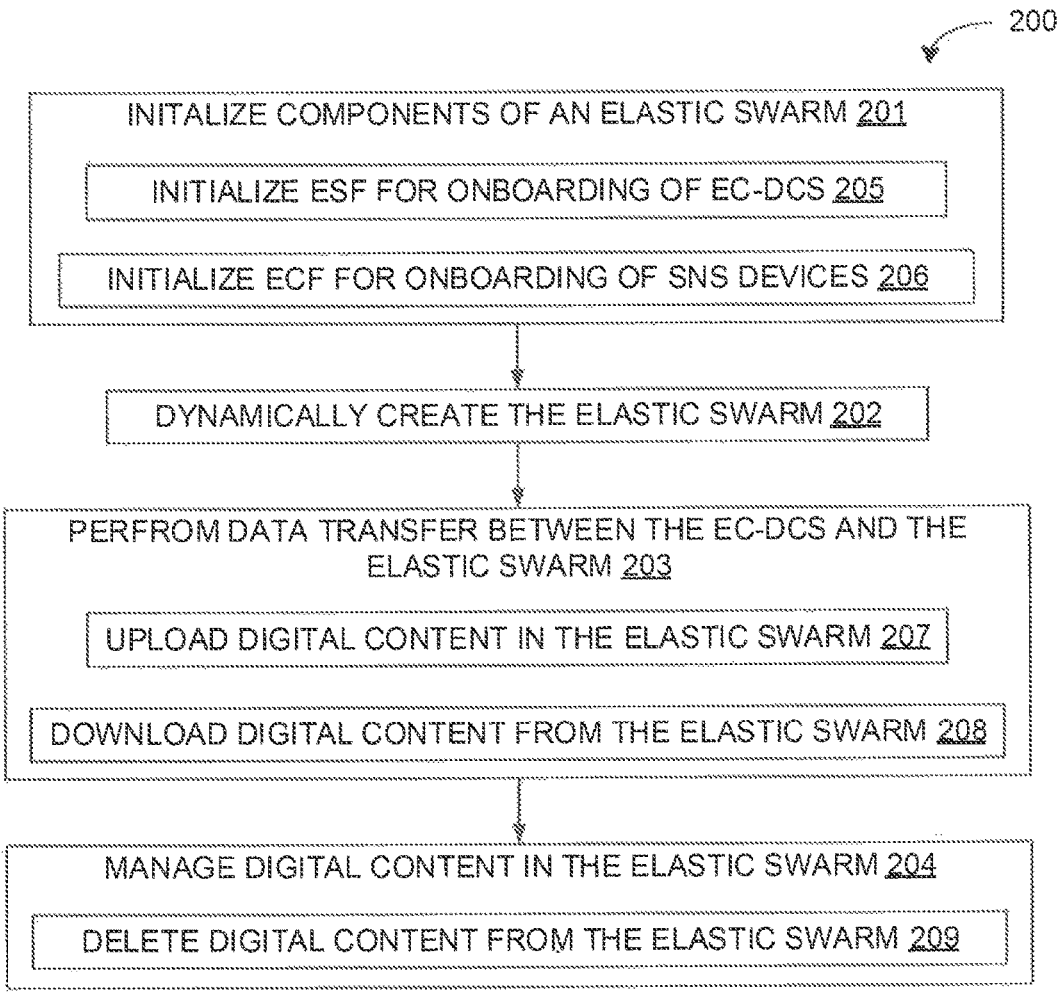
FIG. 2 is a flow diagram of an exemplary process overview for storing and delivering digital content of a content provider in accordance with some embodiments of the present disclosure.

Referring now to FIG. 2, an overview of an exemplary process 200 for storing and delivering digital content of a content provider is depicted via a flowchart in accordance with some embodiments of the present disclosure. The process 200 involves the steps of initializing components of an ElasticSwarm at step 201, dynamically creating the ElasticSwarm at step 202, performing data transfer between the EC-DCS and the ElasticSwarm at step 203, and managing digital content in the ElasticSwarm at step 204. At step 201, the process 200 further involves the steps of initializing ESF for onboarding of EC-DCS at step 205, and initializing ECF for onboarding of SNS devices that would form the ElasticSwarm at step 206. Similarly, at step 203, the process 200 further involves the steps of uploading data (e.g., digital content) in the ElasticSwarm at step 207, and downloading data (e.g., digital content) from the ElasticSwarm at step 208. Additionally, at step 204, the process 200 may involve the step of at least one of deleting digital content from the ElasticSwarm, updating digital content on the ElasticSwarm, migrating digital content within the ElasticSwarm or from one ElasticSwarm to another, and so forth. For example, in the illustrated embodiment, the process 200 may involve the step of deleting digital content from the ElasticSwarm at step 209. Each of these steps will be described in greater detail with reference to FIGS. 3-7 herein below.

Figure 3:
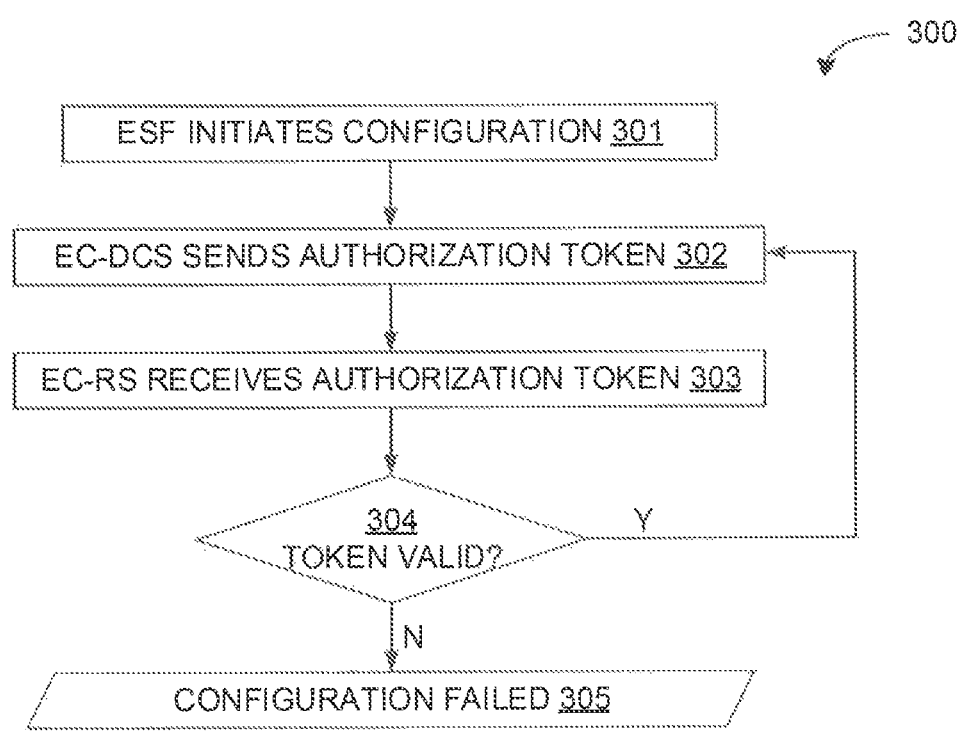
FIG. 3 is a flow diagram of an exemplary process for onboarding of EC-DCS in accordance with some embodiments of the present disclosure.

Referring now to FIG. 3, an exemplary process 300 for onboarding of EC-DCS is depicted via a flowchart in accordance with some embodiments of the present disclosure. The ESF needs to be installed in every EC-DCS's that are responsible for upload and download process for the EC. First time when EC-DCS comes up after installation of ESF, it needs to publish itself by advertising various attributes of the EC to EC-RS. Additionally, the EC-DCS has to be configured with the cluster address for the EC-RS. Thus, the ESF initiates configuration at step 301 as soon as the EC-DCS comes up for the first time after installation of the ESF. The ESF performs handshaking with the EC-RS, and registers its capability with the EC-RS. In order to perform the handshaking operation, the EC-DCS sends an identification or an authorization token to the EC-RS at step 302. In some embodiments, the authorization token may be a 16 bit unique number obtained from an authorized agency. The EC-RS receives the authorization token at step 303 and determines if the authorization token is valid at step 304. The EC-RS has a pre-configured list of EC's and validates the EC against the list. If the EC is valid; EC-RS sends the token back to the EC-DCS. The EC-DCS uses the token to send its capability to the EC-RS for registration using an appropriate capability structure. Once the EC-RS receives the capability structure, it validates it and registers the EC. An acknowledgement may be sent back to the EC-DCS once registration is complete. However, if the EC is not valid, the configuration fails at step 305 and appropriate message may be sent back to the EC-DCS. The exemplary capability structure employed by the EC-DCS to send its capability to the EC-RS is provided below:

```
{
    "identifier" : type long;
    "name" : type character array;
    "description" : type character array;
    "auth_type" : enumeration;
    "auth_token" : type long;
    "timeinfo" :
        {
            "registration_time" : date;
            "last_registration_time" : date;
            "last_deregistration_time" : date;
            "registration_duration" : long
        }
}
```

Figure 4:
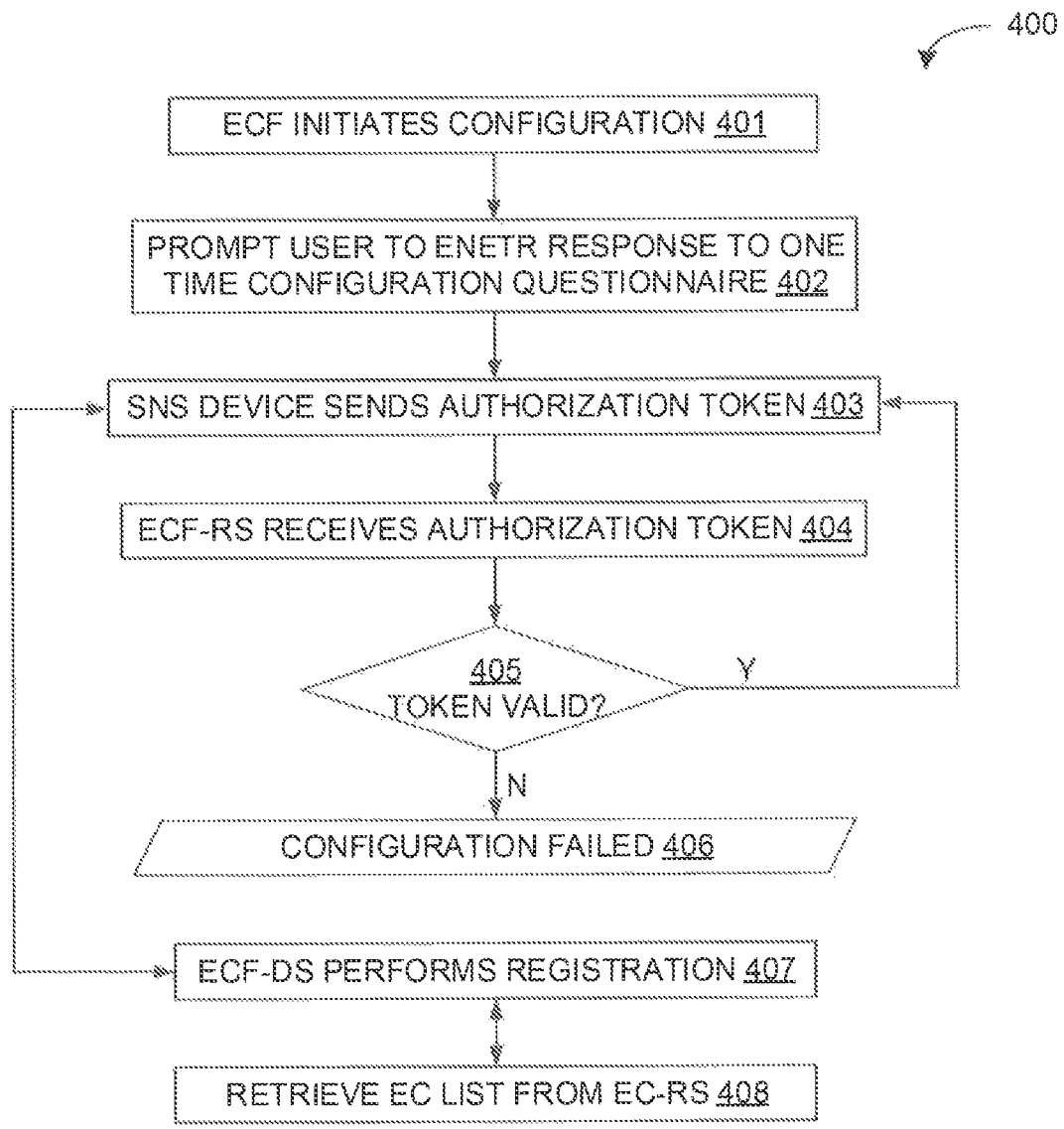
FIG. 4 is a flow diagram of an exemplary process for onboarding of SNS devices in accordance with some embodiments of the present disclosure.

Referring now to FIG. 4, an exemplary process for onboarding of SNS devices 400 is depicted via a flowchart in accordance with some embodiments of the present disclosure. The ECF needs to be installed in the SNS device and appears automatically when the swarmite installs the custom ElasticSearch application in the SNS-Device. The device requires a one-time set-up or configuration by the swarmite as soon as the SNS device comes up for the first time after installation of the ECF. The ECF initiates configuration at step 401. The ECF may then prompt the user or swarmite to enter response to one-time configuration questionnaire at step 402. The one-time configuration questionnaire may include, but is not limited to:

What percentage of storage space do you want to share with the EC's?
  Select EC's with whom you want to share your storage space?
  Do you want your shared storage space to be used as a read intensive unit (RIU) or a write intensive unit (WIU)?
  Does your device has a static or a dynamic IP address?
  What is the average downtime of your SNS device?

The ECF performs handshaking with the ECF-RS and registers its capability with the ECF-RS using a process similar to that of EC-DCS onboarding. In order to perform the handshaking operation, the SNS device sends an authorization token to the ECF-RS at step 403. The ECF-RS receives the authorization token at step 404 and determines if the authorization token is valid at step 405. If the token is valid, the ECF-RS sends the token back to the SNS device. The SNS device then uses the token to send its capability structure to the ECF-RS for registration. An acknowledgement may be sent back to the SNS device once registration is complete. However, if the token is not valid, the configuration fails at step 406 and appropriate message may be sent back to the SNS device. As will be appreciated, during the course of registration, the SNS device needs to make a selection of EC's whose content it would be storing. In order to perform this operation, the ECF interacts with the ECF-DS at step 407. The ECF-DS in turn collects the list of EC's from the EC-RS at step 408, and returns them back to the ECF at step 407. The ECF prompts the swarmite to make a selection the EC's whose data the swarmite wants to store, and sends it again to ECF-DS. The ECF-DS then updates the list to the ECF-RS. After the one-time configuration has been done, the SNS device is ready to become part of an ElasticSwarm.

Figure 5:
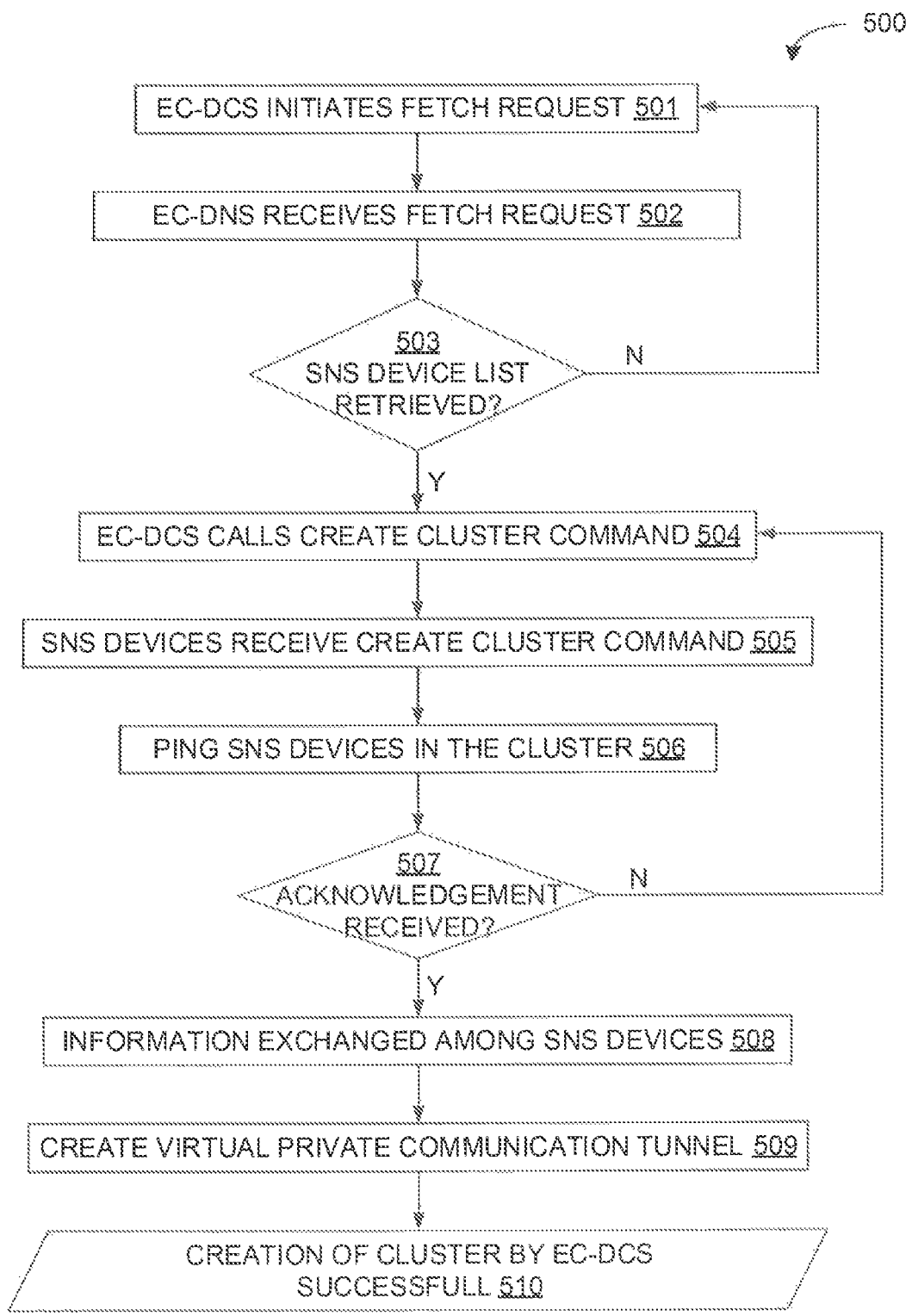
FIG. 5 is a flow diagram of an exemplary process for dynamic creation of an ElasticSwarm in accordance with some embodiments of the present disclosure.

Referring now to FIG. 5, an exemplary process 500 for dynamic creation of an ElasticSwarm is depicted via a flowchart in accordance with some embodiments of the present disclosure. As will be appreciated, the EC's may decide to form an ElasticSwarm based on a need for storing the data (i.e., digital content) on the ElasticSwarm. The EC may decide the need based on a list of factors that may include, but are not limited to, a download rate of a data, a size of the data, a number of unique users accessing the data, a privacy criteria for the data, a network throughput at a time of each of the downloads, and a geographic location of each of the downloads. Once the decision has been made to form the ElasticSwarm, the EC may create the ElasticSwarm for storing the data by selecting the available SNS devices.

The EC-DCS initiates a fetch request to the EC-DNS for a list of SNS devices for the EC at step 501. The EC-DNS receives the fetch request at step 502 and communicates with the EC-RS so as to retrieve the list of SNS devices for the EC. Apart from a pre-indicated interest of SNS device to form ElasticSwarm for the EC, other parameters of the SNS devices may be considered by EC-DNS for determining the SNS devices for creation of the ElasticSwarm for the EC. These parameters may include, but are not limited to, a geographic location, a maximum availability time, a committed storage size, a nature of the IP address, a network speed, an active swarm participation count, a type of storage device, a system resource utilization, and a system resource availability. In some embodiments, the fetch request initiated by the EC-DCS may include one or more parameters (e.g., geographic location, etc.) for selection or determination of the SNS devices. The EC-DNS then determines if the list of SNS devices has been retrieved at step 503. If the list has not been retrieved, the fetch request is initiated again by the EC-DCS at step 501. However, if the list has been retrieved, the EC-DNS sends the same to the EC-DCS of the EC. In some embodiments, the EC-DCS selects a set SNS devices from the retrieved list for the creation of ElasticSwarm based on one or more parameters (e.g., geographic location, maximum availability time, etc.) for selection or determination of the SNS devices.

In order to create an ElasticSwarm, the EC-DCS issues a 'create cluster command' at step 504 to each of ECF's running in each of the SNS devices in the cluster (i.e., SNS devices in the retrieved list or selected SNS devices from the retrieved list). It should be noted that the 'create cluster command' provides information about all the SNS devices in the cluster to be created. The ECF's in the SNS devices receive the 'create cluster command' at step 505. Additionally, the EC-DCS pings the SNS devices in the cluster at step 506, and determines if the acknowledgement has been received at step 507. If the acknowledgement has not been received, the EC-DCS again issues a 'create cluster command' at step 504. However, if the acknowledgment has been received at step 507, the SNS devices in the cluster communicate amongst each other to determine their availability at step 508. In some embodiments, the communication involves each SNS device sending a ping to other SNS devices in the cluster, and determining if acknowledgement has been received from all of the other SNS devices. If the acknowledgement has not been received, the SNS device may repeat the process for a pre-defined number of attempts, and, in case of failure in all the attempts, sends failure response to the EC-DCS. However, if the acknowledgement has been successfully received, the SNS device exchange information such as speed, geographic location, authentication information, etc. with all of the other SNS devices. Once the negotiation is successful, a private communication tunnel is created between the SNS devices at step 509. The EC-DCS receives acknowledgement from all the devices and determines that the cluster (i.e., an ElasticSwarm) has been successfully created at step 510. In some embodiments, the EC-DCS may assign a name for the ElasticSwarm.

Additionally, as will be appreciated, the SNS devices that form the ElasticSwarm may not have a permanent or static IP addresses, or may have frequent downtimes, or may want to exit the ElasticSwarm altogether. The ElasticSwarm may therefore have to be dynamically recreated by removing unavailable existing SNS devices or adding new SNS devices to the ElasticSwarm. The process may therefore determine a validity of the ElasticSwarm at a regular interval by determining an availability of the SNS device. The check for availability of SNS devices is to make sure that if any SNS device exits or goes down, the ElasticSwarm may be re-created. To ensure the detection of the continuous presence of a swarmite (i.e., SNS device), the ECF is configured to send a pulse to the ECF-DS at regular intervals that indicates the availability of the SNS device. In some embodiments, the ECF starts sending pulse to the ECF-DS after the one-time configuration of the SNS device. In some embodiments, the pulse may include a set of information such as capabilities of the swarmite, current location of the swarmite, array of keys associated to each piece of data that is currently stored in the swarmite, and so forth. An exemplary data structure for the pulse is provided below:

```
typedef struct __Swarmite__Capabilities
{
    Boolean    hasStaticIPAddress;
    Uint64     averageDowntime;
    Boolean    isReadIntensive;
    Boolean    isWriteIntensive;
} Swarmite__Capabilities;
typedef struct __Swarmite__Location
{
    Coordinate__Address       address;
    Ping__Time                time;
} Swarmite__Location;
typedef struct __iNode__Key
{
    U8 Key:    n;
} iNode__Key;
typedef struct __Pulse
{
    Swarmite__Capabilities    capabilities;
    Swarmite__Location        location;
    iNode__Key                keys [ ];
} Pulse;
```

If in case a swarmite goes down, ECF-DS detects the same by not receiving the pulse, and sends an interrupt signal to EC-DNS. The EC-DNS then sends an interrupt signal to EC-DCS with the information of the swarmite which is down. The EC-DCS then starts reconfiguring the whole ElasticSwarm again. In some embodiments, the EC-DCS checks availability of new SNS device for preforming the reconfiguration. However, if new SNS device is not available, the EC-DCS checks if the current SNS devices are sufficient enough to serve the content or not. Further, in some embodiments, the reconfiguration may not be necessary if the redundancy level for the whole ElasticSwarm is sufficient enough.

Figure 6:
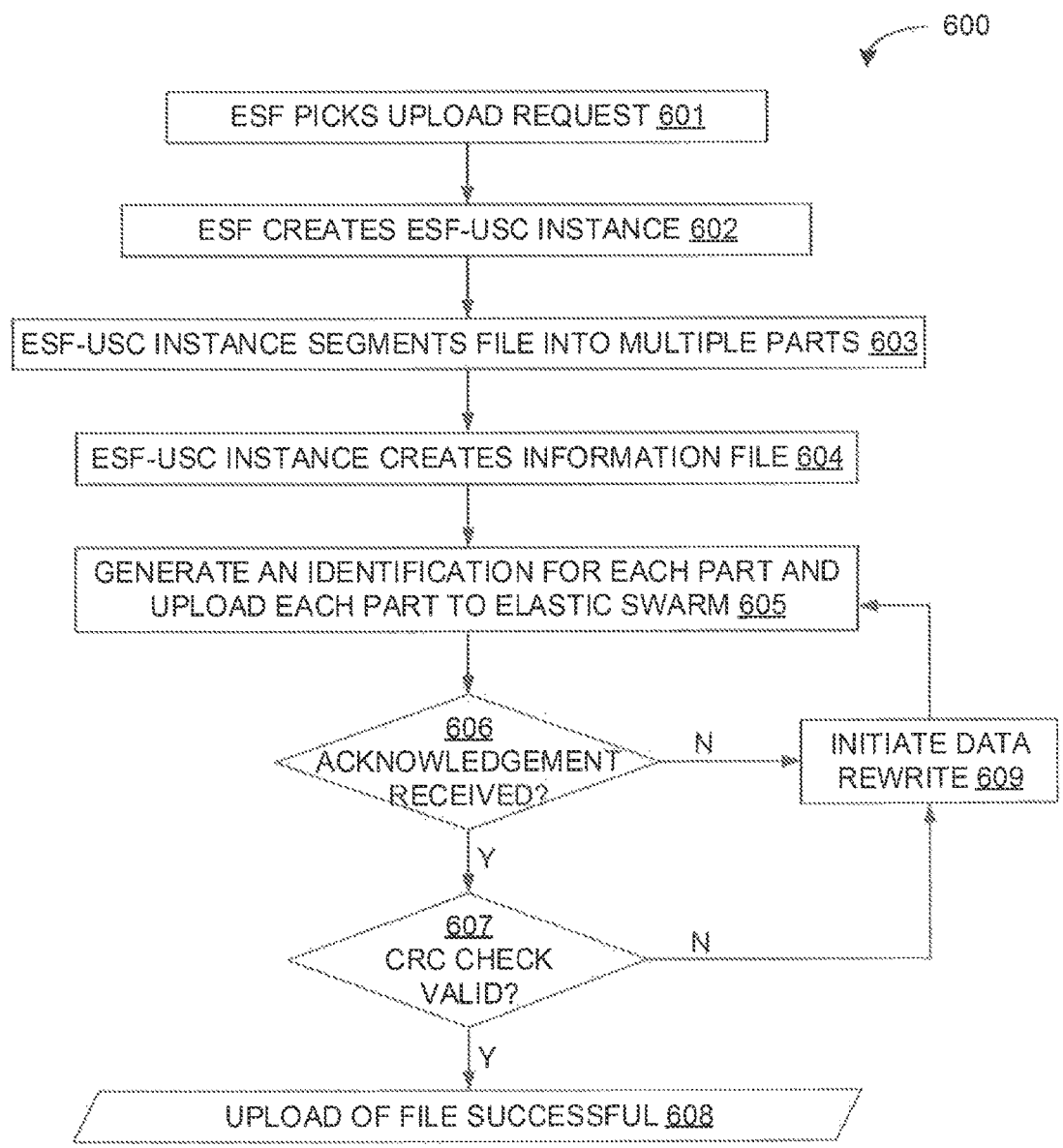
FIG. 6 is a flow diagram of an exemplary process for uploading digital content of a content provider in an ElasticSwarm in accordance with some embodiments of the present disclosure.

Referring now to FIG. 6, an exemplary process 600 for uploading digital content of a content provider in an ElasticSwarm is depicted via a flowchart in accordance with some embodiments of the present disclosure. The ESF picks upload request at step 601. The ESF then creates an instance of ESF uploading service class (ESF-USC) at step 602 to handle the complete upload process. It should be noted that multiple instances of ESF-USC may be created, and executed serially or in parallel by the ESF. The ESF-USC segments the digital content or the file to be uploaded into multiple parts at step 603. Each part may be referred to as an 'iNode'. The ESF-USC further creates an information file which contains meta-information about the digital content or the file to be uploaded at step 604. The information file may be referred to as an '.upload file' and may include information such as description of the file, size of the file, address of the file (i.e., URL of the EC-DCS storing the file), and so forth. An identification of each part is generated and the parts are then pushed to the ElasticSwarm at step 605. The identification of each part may be referred to as 'elastic id'. In some embodiments, each of the part is pushed to the ElasticSwarm using REST protocol.

The ElasticSwarm creates an acknowledgement response and sends the same to ESF-USC if it's able to write the data successfully at step 606. The ElasticSwarm further performs CRC check of the data, and if it is valid creates another acknowledgement response and sends the same to ESC-USC at step 607. Thus, the ESF-USC, upon receiving both the acknowledgement responses from steps 606 and 607, determines that the upload of digital content or the file has been successful at step 608. However, if the ESF-USC does not receive any of the two acknowledgement responses from steps 606 and 607, if determines that the upload of digital content or the file has not been successful and initiates data rewrite at step 609. It should be noted that the information with respect to identification of the part (i.e., elastic id), CRC check, upload timestamp, and so forth may be appended to the information file upon successful data upload. Thus, in some embodiments, the meta-information comprises all the information generated during upload process such as an identification of each of the plurality of parts, address of the at least one of the plurality of registered SNS devices, a cyclic redundancy check (CRC) information, a timestamp of the upload, and so forth. Additionally, in some embodiments, the meta-information comprises service level agreement (SLA) information such as expected redundancy depth of each iNodes, expected level of security (e.g., which encryption algorithm is employed), read intensive file or write intensive file, and so forth. Thus, once the ESF-USC is able to write the data successfully to the ElasticSwarm (i.e., in all the SNS devices in the ElasticSwarm), it finalizes the information file (i.e., '.upload file') and saves the same in the EC-DCS. The ESF then terminates the ESF-USC instance. An exemplary implementation of the ESF-USC is provided below:

```
class SSF_USC
{
private:
    FILE              *m_FILE_PTR;
    Uint64            m_size_of_FILE;
    Uint64            m_number_of_iNodes;
    Uint16            m_size_of_an_iNode;
    UPLOAD_FILE       *m_UPLOAD_FILE_Handle;
    Uint64            m_current_iNode_uploaded;
    iNODE             m_iNodes[ ];
public:
    Form_iNode_Key( );
    Form_Master_Key( );
    Append_iNode_Key_Into_Master_Key( );
    Edit_UPLOAD_FILE( );
    Broadcast_Updated_UPLOAD_FILE( );
    Stripe_FILE_Into_iNodes( );
    Get_Next_FILE_iNode_to_Upload( );
};
```

Similarly, in case of a download request from an end user, the EC-DCS first checks if the requested digital content or file is available in an ElasticSwarm or not. Additionally, the EC-DCS checks a geographic location of the download request across the list of swarm location. If there is a match for both, the EC-DCS validates the end user, and sends a response to end user providing with an authorization token required to establish communication with the ElasticSwarm and the information file (i.e., '.upload file') containing every information about the requested file stored in the Elastic-Swarm that may be required to download the file from the ElasticSwarm. Upon receiving these data, the end user may communicate with the ElasticSwarm where the digital content or the file resides currently using the authorization token. In some embodiments, REST protocol may be used for the communication. Further, in the process of reading the data, user application also need to check the CRC. In case, the CRC check fails, the user application has to contact the EC by providing the failure file identification (e.g., elastic id or iNode). The EC may typically respond by sending back the packet. Additionally, the EC-DCS starts recovery process of the corrupted iNode.

Figure 7:
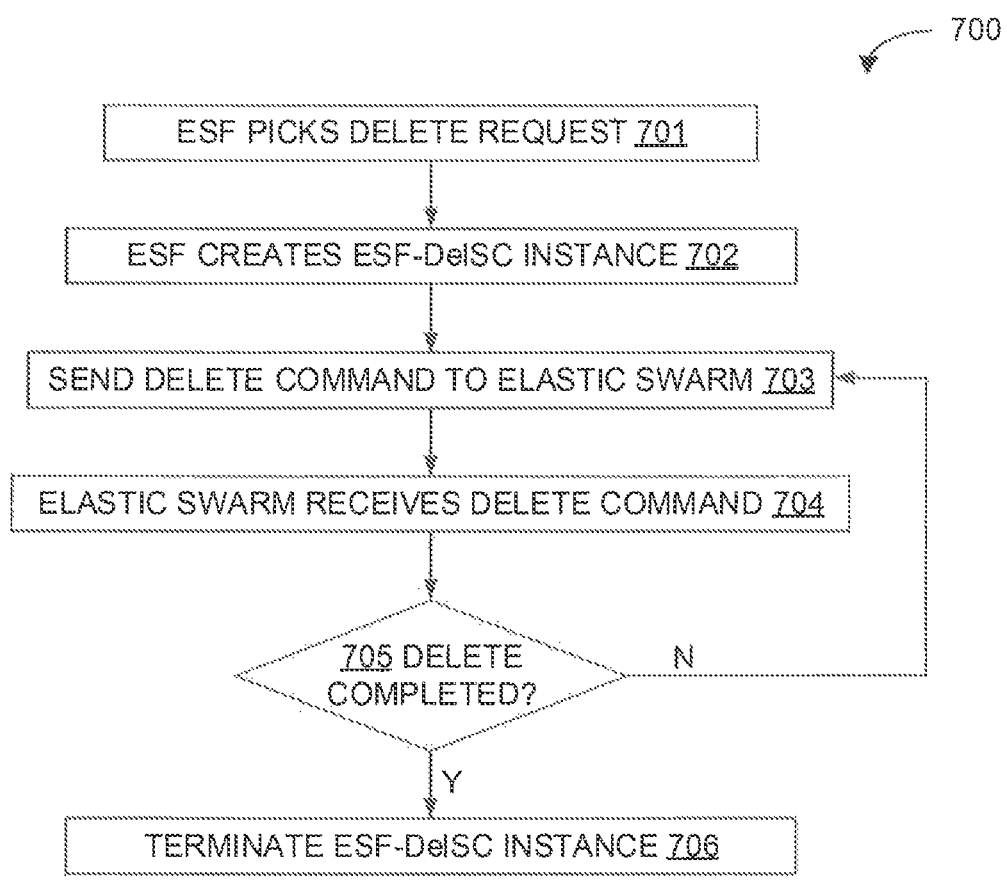
FIG. 7 is a flow diagram of an exemplary process for deleting digital content from an ElasticSwarm in accordance with some embodiments of the present disclosure.

Referring now to FIG. 7, an exemplary process 700 for deleting digital content from an ElasticSwarm is depicted via a flowchart in accordance with some embodiments of the present disclosure. The ESF picks delete request at step 701. The ESF then creates an instance of ESF deleting service class (ESF-DelSC) at step 702 in order to delete the previously uploaded content from the ElasticSwarm. It should be noted that multiple instances of ESF-DelSC may be created and executed in parallel by the ESF. The ESF-DelSC sends 'delete command' to the ElasticSwarm at step 703. It should be noted that, in some embodiments, the 'delete command' may be a single REST call in which identifications (i.e., elastic ids) of all the parts (i.e., iNodes) of the file to be deleted may be sent to the ElasticSwarm. The ElasticSwarm receives the 'delete command' at step 704. The Elastic-Swarm then deletes all the parts of the file stored with those identifications, and determines if the deletion process is complete at step 705. If the deletion process is not complete, the ElasticSwarm continues to delete the parts of the file stored with those identifications. However, if the deletion process is complete, the ElasticSwarm sends an acknowledgement. Upon receiving the acknowledgement, the ESF terminates the ESF-DelSC instance.

As will be appreciated by one skilled in the art, a variety of processes may be employed for storing and delivering digital content of a content provider. For example, the exemplary distributed content storage and delivery (DCSD) system 100 may facilitate storage and delivery of digital content of a content provider via a peer-to-peer storage swarm by the processes discussed herein. In particular, as will be appreciated by those of ordinary skill in the art, control logic and/or automated routines for performing the techniques and steps described herein may be implemented by components of the DCSD system 100, either by hardware, software, or combinations of hardware and software. For example, a suitable code may be accessed and executed by the one or more processors on the DCSD system 100 to perform some or all of the techniques described herein. Similarly, application specific integrated circuits (ASICs) configured to perform some or all of the processes described herein may be included in the one or more processors on the system 100.

Figure 8:
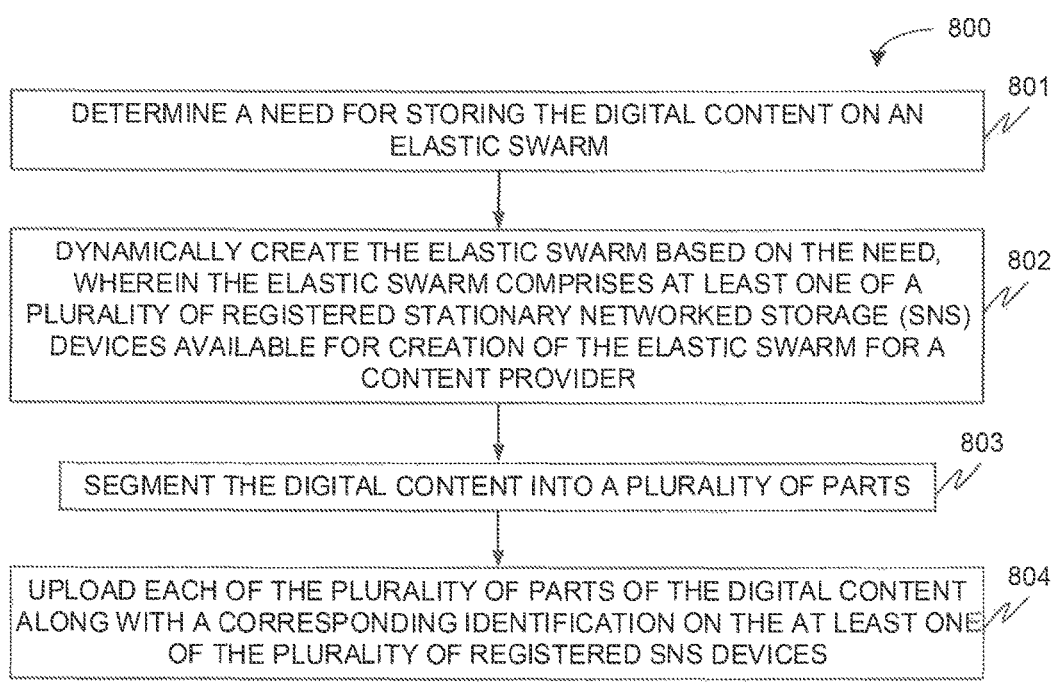
FIG. 8 is a flow diagram of an exemplary process for storing and delivering digital content of a content provider in accordance with some embodiments of the present disclosure.

For example, referring now to FIG. 8, exemplary control logic 800 for storing and delivering digital content of a content provider via a system, such as the DCSD system 100, is depicted via a flowchart, in accordance with some embodiments of the present disclosure. As illustrated in the flowchart, the control logic 800 includes the steps of determining a need for storing the digital content on an Elastic-Swarm at step 801 and dynamically creating the Elastic-Swarm based on the need at step 802. The ElasticSwarm comprises at least one of a plurality of registered stationary networked storage (SNS) devices available for creation of the ElasticSwarm for the content provider. The control logic 800 further includes the steps of segmenting the digital content into a plurality of parts at step 803, and uploading each of the plurality of parts of the digital content along with a corresponding identification on the at least one of the plurality of registered SNS devices at step 804.

In some embodiments, the control logic 800 further includes the step of registering each of one or more data centers of each of a plurality of content providers by sending an authentication token to a data center registry upon initiation, and sending a capability structure to the data center registry upon validation of the authentication token. Additionally, in some embodiments, the control logic 800 further includes the step of registering each of a plurality of SNS devices by sending an authentication token to a SNS registry upon initiation, and sending a capability structure and a registration information to the SNS registry upon validation of the authentication token. The registration information comprises a committed storage size and at least one of a plurality of content providers.

In some embodiments, determining the need at step 801 comprises determining the need based on at least one of a download rate of the digital content, a size of the digital content, a number of unique users downloading the content, a privacy criteria for the digital content, a network throughput at a time of each of the downloads, and a geographic location of each of the downloads. Additionally, in some embodiments, dynamically creating the ElasticSwarm at step 802 comprises determining a set of the plurality of registered SNS devices for creation of the ElasticSwarm for the content provider based on one or more parameters of each of the plurality of registered SNS devices, determining the availability of the at least one of the plurality of registered SNS devices available for creation of the ElasticSwarm for the content provider based on communication among the set of the plurality of registered SNS devices, and creating a private communication tunnel among the at least one of the plurality of registered SNS devices available for creation of the ElasticSwarm for the content provider. The one or more parameters comprise at least one of a geographic location, a maximum availability time, a committed storage size, a nature of the IP address, a network speed, an active swarm participation count, a type of storage device, a system resource utilization, and a system resource availability. Further, in some embodiments, dynamically creating the ElasticSwarm at step 802 comprises determining a validity of the ElasticSwarm at a regular interval based on an availability of the at least one of the plurality of registered SNS devices.

In some embodiments, the control logic 800 further includes the step of validating each of the plurality of parts of the digital content upon uploading on the at least one of the plurality of registered SNS devices. Additionally, in some embodiments, the control logic 800 further includes the step of creating an information file comprising meta-information about the digital content. The meta-information comprises an address of a data center server of the content provider, an identification of each of the plurality of parts, an address of the at least one of the plurality of registered SNS devices, a timestamp of the upload, a security information, and a cyclic redundancy check (CRC) information. Further, in some embodiments, the control logic 800 further includes the step of handling a download request from the end user by determining an availability of the digital content on the at least one of the plurality of registered SNS devices based on a geographic location of the download request, and sending the information file to the end user based on the availability for downloading the digital content. Moreover, in some embodiments, the control logic 800 further includes the step of deleting the digital content from the at least one of the plurality of registered SNS devices by sending identification of each of the plurality of parts of the digital content to the at least one of the plurality of registered SNS devices.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 9:
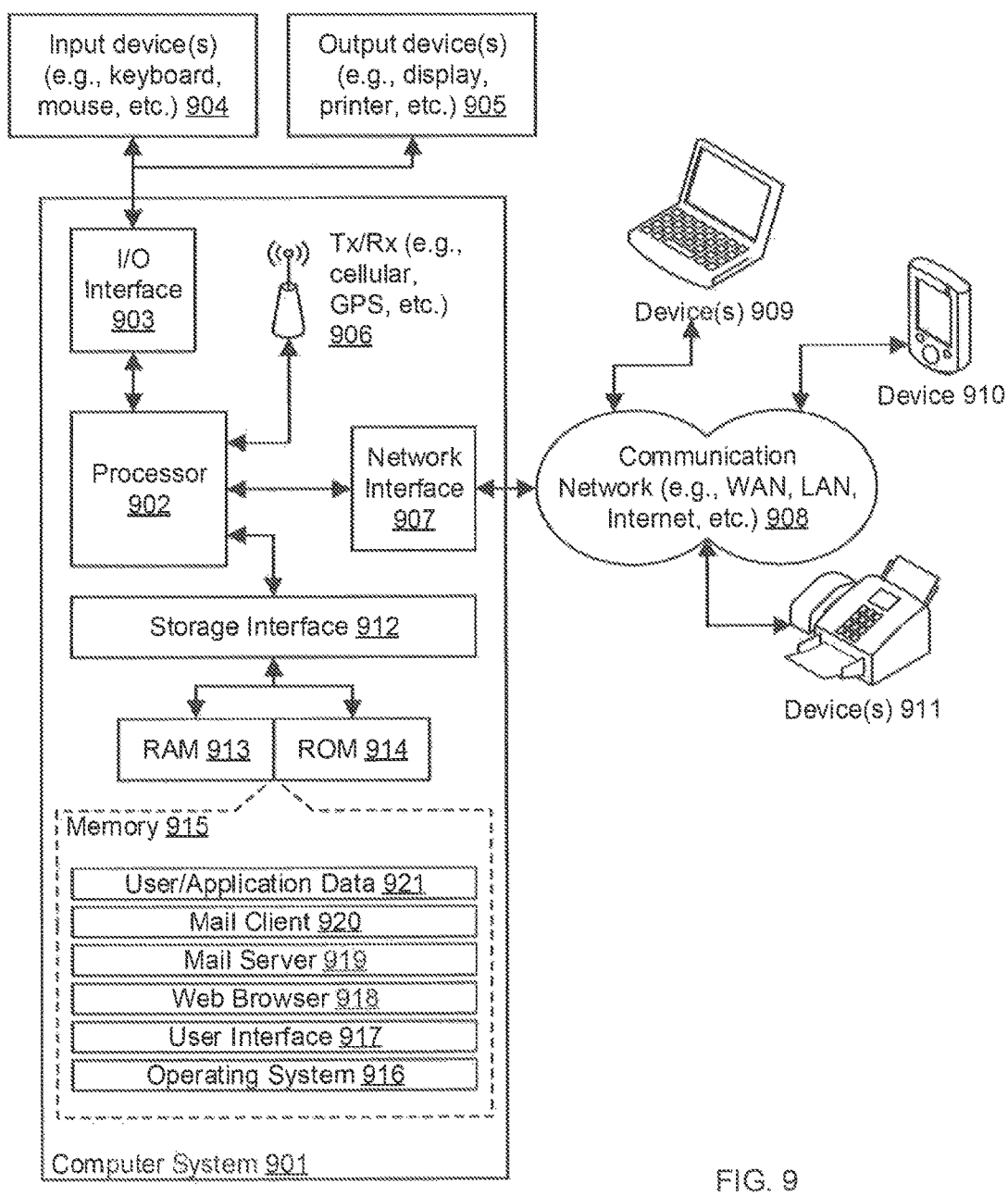
FIG. 9 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 9, a block diagram of an exemplary computer system 901 for implementing embodiments consistent with the present disclosure is illustrated. Variations of computer system 901 may be used for implementing components of DCSD system 100 for storing and delivering digital content of a content provider. Computer system 901 may include a central processing unit ("CPU" or "processor") 902. Processor 902 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 902 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 902 may be disposed in communication with one or more input/output (I/O) devices via I/O interface 903. The I/O interface 903 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 903, the computer system 901 may communicate with one or more I/O devices. For example, the input device 904 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 905 may be a printer, fax machine, video display (e.g., cathode ray tube (CRT), liquid crystal display (LCD), light-emitting diode (LED), plasma, or the like), audio speaker, etc. In some embodiments, a transceiver 906 may be disposed in connection with the processor 902. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 902 may be disposed in communication with a communication network 908 via a network interface 907. The network interface 907 may communicate with the communication network 908. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 908 may include, without limitation, a direct interconnection, local area network (LAN), wide area network (WAN), wireless network (e.g., using Wireless Application Protocol), the Internet, etc. Using the network interface 907 and the communication network 908, the computer system 901 may communicate with devices 909, 910, and 911. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 901 may itself embody one or more of these devices.

In some embodiments, the processor 902 may be disposed in communication with one or more memory devices (e.g., RAM 913, ROM 914, etc.) via a storage interface 912. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 916, user interface application 917, web browser 918, mail server 919, mail client 920, user/application data 921 (e.g., any data variables or data records discussed in this disclosure), etc. The operating system 916 may facilitate resource management and operation of the computer system 901. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 917 may facilitate display, execution, interaction, manipulation, or operation of program components through textual or graphical facilities. For example, user interfaces may provide computer interaction interface elements on a display system operatively connected to the computer system 901, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 901 may implement a web browser 918 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 901 may implement a mail server 919 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 901 may implement a mail client 920 stored program component. The mail client may be a mail viewing application, such as Apple Mail, Microsoft Entourage, Microsoft Outlook, Mozilla Thunderbird, etc.

In some embodiments, computer system 901 may store user/application data 921, such as the data, variables, records, etc. (e.g., digital content, configuration settings, list of selected EC's, list of SNS devices for a given EC, parts of digital content (iNodes), information file (.update file), identifications of the parts (elastic ID's), and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques, described in the various embodiments discussed above, provide for a peer-to-peer (P2P) storage swarm or ElasticSwarm for storage and delivery of digital contents of a content provider. The ElasticSwarm comprises various ubiquitous computing devices having significant storage communicatively connected over a high speed communication network so as to create a unified storage cluster. The unified storage cluster is then used by the content provider to store and deliver digital contents to an end user. Additionally, these connected devices acts like a peer-to-peer device, as they achieves replication, fail over etc. over a peer-to-peer communication. Such ElasticSwarm provide for an efficient and cost effective storage and delivery of digital contents as the content provider does not need to maintain or supervise the ElastiSwarm. Additionally, such ElasticSwarm reduces the network usage of the content provide, increases the data streaming speed for the end user, and decreases the storage usage of the content provider. In other words, the ElasticSwarm provides performance, security and availability of the digital content, such that that the content provider may reliably store data, and users may consume that data with better performance.

Further, the techniques, described in the various embodiments discussed above, provide for a highly dynamic P2P storage system that allows on-boarding and off-boarding of user devices based on their availability. The techniques employ user devices, thereby eliminating or otherwise reducing the requirement of virtual servers or any other kind of servers for content storage. Additionally, the techniques employ registry servers for facilitating registration of content provider servers and user devices that form the ElasticSwarm, and for facilitating creation of the ElasticSwarm. However, these servers do not perform content storage and delivery. This feature ensures data security as well as data privacy.

The specification has described system and method for storing and delivering digital content of a content provider. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for storing a digital content of a content provider for subsequent delivery to an end user, the method comprising:
    determining, via a distributed content storage and delivery (DCSD) system, a need for storing the digital content on an ElasticSwarm;
    dynamically creating, via the DCSD system, the ElasticSwarm based on the need, wherein the ElasticSwarm comprises at least one of a plurality of registered stationary networked storage (SNS) devices available for creation of the ElasticSwarm for the content provider, wherein dynamically creating the ElasticSwarm comprises;
        determining a set of the plurality of registered SNS devices for creation of the ElasticSwarm for the content provider based on one or more parameters of each of the plurality of registered SNS devices;
        determining the availability of the at least one of the plurality of registered SNS devices available for creation of the ElasticSwarm for the content provider based on communication among the set of the plurality of registered SNS devices; and
        creating a private communication tunnel among the at least one of the plurality of registered SNS devices available for creation of the ElasticSwarm for the content provider, wherein the one or more parameters comprise at least one of a geographic location, a maximum availability time, a committed storage size, a nature of the IP address, a network speed, an active swarm participation count, a type of storage device, a system resource utilization, and a system resource availability;
    segmenting, via the DCSD system, the digital content into a plurality of parts; and
    uploading, via the DCSD system, each of the plurality of parts of the digital content along with a corresponding identification on the at least one of the plurality of registered SNS devices.

2. The method of claim 1, further comprising registering each of one or more data centers of each of a plurality of content providers by:
    sending an authentication token to a data center registry upon initiation;
    sending a capability structure to the data center registry upon validation of the authentication token.

3. The method of claim 1, further comprising registering each of a plurality of SNS devices by:
    sending an authentication token to a SNS registry upon initiation;
    sending a capability structure and a registration information to the SNS registry upon validation of the authentication token, wherein the registration information comprises a committed storage size and at least one of a plurality of content providers.

4. The method of claim 1, wherein determining the need comprises determining the need based on at least one of a download rate of the digital content, a size of the digital content, a number of unique users downloading the content, a privacy criteria for the digital content, a network throughput at a time of each of the downloads, and a geographic location of each of the downloads.

5. The method of claim 1, wherein dynamically creating the ElasticSwarm comprises determining a validity of the ElasticSwarm at a regular interval based on an availability of the at least one of the plurality of registered SNS devices.

6. The method of claim 1, further comprising validating each of the plurality of parts of the digital content upon uploading on the at least one of the plurality of registered SNS devices.

7. The method of claim 1, further comprising creating an information file comprising meta-information about the digital content, wherein the meta-information comprises an address of a data center server of the content provider, an identification of each of the plurality of parts, an address of the at least one of the plurality of registered SNS devices, a timestamp of the upload, a security information, and a cyclic redundancy check (CRC) information.

8. The method of claim 7, further comprising handling a download request from the end user by:

determining an availability of the digital content on the at least one of the plurality of registered SNS devices based on a geographic location of the download request; and sending the information file to the end user based on the availability for downloading the digital content.

9. The method of claim 1, further comprising deleting the digital content from the at least one of the plurality of registered SNS devices by sending identification of each of the plurality of parts of the digital content to the at least one of the plurality of registered SNS devices.

10. A system for storing a digital content of a content provider for subsequent delivery to an end user, the system comprising:
at least one processor; and
a memory for storing instructions that, when executed by the at least one processor, cause the at least one processor to perform operations comprising:
determining a need for storing the digital content on an ElasticSwarm; dynamically creating the ElasticSwarm based on the need wherein the ElasticSwarm comprises at least one of a plurality of registered stationary networked storage (SNS) devices available for creation of the ElasticSwarm for the content provider, wherein dynamically creating the ElasticSwarm comprises:
determining a set of the plurality of registered SNS devices for creation of the ElasticSwarm for the content provider based on one or more parameters of each of the plurality of registered SNS devices;
determining the availability of the at least one of the plurality of registered SNS devices available for creation of the ElasticSwarm for the content provider based on communication among the set of the plurality of registered SNS devices; and
creating a private communication tunnel among the at least one of the plurality of registered SNS devices available for creation of the ElasticSwarm for the content provider, wherein the one or more parameters comprise at least one of a geographic location, a maximum availability time, a committed storage size, a nature of the IP address, a network speed, an active swarm participation count, a type of storage device, a system resource utilization, and a system resource availability;
segmenting the digital content into a plurality of parts; and
uploading each of the plurality of parts of the digital content along with a corresponding identification on the at least one of the plurality of registered SNS devices.

11. The system of claim 10, wherein the operations further comprise at least one of:
registering each of one or more data centers of each of a plurality of content providers by sending an authentication token to a data center registry upon initiation, and sending a capability structure to the data center registry upon validation of the authentication token; and
registering each of a plurality of SNS devices by sending an authentication token to a SNS registry upon initiation, and sending a capability structure and a registration information to the SNS registry upon validation of the authentication token, wherein the registration information comprises a committed storage size and at least one of a plurality of content providers.

12. The system of claim 10, wherein determining the need comprises determining the need based on at least one of a download rate of the digital content, a size of the digital content, a number of unique users accessing the content, a privacy criteria for the digital content, a network throughput at a time of each of the downloads, and a geographic location of each of the downloads.

13. The system of claim 10, wherein dynamically creating the ElasticSwarm comprises determining a validity of the ElasticSwarm at a regular interval based on an availability of the at least one of the plurality of registered SNS devices.

14. The system of claim 10, wherein the operations further comprise validating each of the plurality of parts of the digital content upon uploading on the at least one of the plurality of registered SNS devices.

15. The system of claim 10, wherein the operations further comprise:
creating an information file comprising meta-information about the digital content, wherein the meta-information comprises an address of a data center server of the content provider, an identification of each of the plurality of parts, an address of the at least one of the plurality of registered SNS devices, a timestamp of the upload, a security information, and a cyclic redundancy check (CRC) information; and
handling a download request from the end user by:
determining an availability of the digital content on the at least one of the plurality of registered SNS devices based on a geographic location of the download request; and
sending the information file to the end user based on the availability for downloading the digital content.

16. The system of claim 10, wherein the operations further comprise deleting the digital content from the at least one of the plurality of registered SNS devices by sending identification of each of the plurality of parts of the digital content to the at least one of the plurality of registered SNS devices.

17. A non-transitory computer-readable medium storing instructions for storing a digital content of a content provider for subsequent delivery to an end user, wherein upon execution of the instructions by one or more processors, the processors perform operations comprising:
determining a need for storing the digital content on an ElasticSwarm; dynamically creating the ElasticSwarm based on the need, wherein the ElasticSwarm comprises at least one of a plurality of registered stationary networked storage (SNS) devices available for creation of the ElasticSwarm for the content provider, wherein dynamically creating the ElasticSwarm comprises:
determining a set of the plurality of registered SNS devices for creation of the ElasticSwarm for the content provider based on one or more parameters of each of the plurality of registered SNS devices;
determining the availability of the at least one of the plurality of registered SNS devices available for creation of the ElasticSwarm for the content provider based on communication among the set of the plurality of registered SNS devices; and
creating a private communication tunnel among the at least one of the plurality of registered SNS devices available for creation of the ElasticSwarm for the content provider, wherein the one or more parameters comprise at least one of a geographic location, a maximum-availability time, a committed storage size, a nature of the IP address, a network speed, an active swarm participation count, a type of storage device, a system resource utilization, and a system resource availability;
segmenting the digital content into a plurality of parts; and uploading each of the plurality of parks of the digital content along with a corresponding identification on the at least one of the plurality of registered SNS devices.

* * * * *